US009776621B2

(12) United States Patent
Sato (10) Patent No.: US 9,776,621 B2
(45) Date of Patent: Oct. 3, 2017

(54) ENGINE START SUPPRESSION FOR A HYBRID CAR

(71) Applicant: TOYOTA JIDOSHA KABUSHIKI KAISHA, Toyota-shi, Aichi-ken (JP)

(72) Inventor: Keita Sato, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/200,061

(22) Filed: Jul. 1, 2016

(65) Prior Publication Data

US 2017/0008509 A1 Jan. 12, 2017

(30) Foreign Application Priority Data

Jul. 6, 2015 (JP) ................................. 2015-135101

(51) Int. Cl.
*B60L 9/00* (2006.01)
*B60L 11/00* (2006.01)
(Continued)

(52) U.S. Cl.
CPC ............ *B60W 20/13* (2016.01); *B60K 6/445* (2013.01); *B60K 6/48* (2013.01); *B60K 6/52* (2013.01); *B60W 10/06* (2013.01); *B60W 10/08* (2013.01); *B60W 10/26* (2013.01); *B60W 20/11* (2016.01); *B60W 30/182* (2013.01); *B60K 2006/4825* (2013.01); *B60W 2510/087* (2013.01); *B60W 2510/244* (2013.01); *B60W 2510/246* (2013.01); *B60W 2520/10* (2013.01); *B60W 2540/10* (2013.01); *B60W 2710/244* (2013.01); *Y10S 903/916* (2013.01); *Y10S 903/93* (2013.01)

(58) Field of Classification Search
CPC ...... B60W 20/13; B60W 20/11; B60W 10/06; B60W 10/08; B60W 10/26; B60W 30/182; B60K 6/445; B60K 6/48; B60K 6/52; B60K 2006/482
See application file for complete search history.

(56) References Cited

U.S. PATENT DOCUMENTS

| 6,655,485 B1* | 12/2003 | Ito ........................ B60W 20/40 180/65.6 |
| 8,089,169 B2* | 1/2012 | Maeda .................. H02J 7/1461 290/40 C |

(Continued)

FOREIGN PATENT DOCUMENTS

JP 2011-57116 3/2011

*Primary Examiner* — Nicholas Kiswanto
*Assistant Examiner* — Kenny A Taveras
(74) *Attorney, Agent, or Firm* — Finnegan, Henderson, Farabow, Garrett & Dunner, LLP (57) ABSTRACT

During EV traveling in a CD mode, an electronic control unit determine that an engine is in a state where the engine is likely to be started when an electric power storage ratio SOC of a battery falls short of a threshold Sref, when a battery temperature Tb of the battery falls short of a threshold Tbref, when an output limit Wout of the battery falls short of a threshold Wref, when a temperature Tmg2 of a motor is higher than a threshold Tmg2ref, and when a torque limit Tm2lim of the motor falls short of a threshold Tm2limref. Then, the electronic control unit set a required torque Tr* by using a map for a CS mode in which the required torque Tr* is set to be lower than in a map for the CD mode.

6 Claims, 6 Drawing Sheets

(51) Int. Cl.
  *G05D 1/00* (2006.01)
  *B60W 20/13* (2016.01)
  *B60W 10/06* (2006.01)
  *B60W 10/08* (2006.01)
  *B60K 6/48* (2007.10)
  *B60K 6/445* (2007.10)
  *B60K 6/52* (2007.10)
  *B60W 10/26* (2006.01)
  *B60W 30/182* (2012.01)
  *B60W 20/11* (2016.01)

(56) References Cited

U.S. PATENT DOCUMENTS

| | | | | |
|---|---|---|---|---|
| 2001/0029424 | A1* | 10/2001 | Iwamoto | B60K 6/543 701/114 |
| 2002/0092296 | A1* | 7/2002 | Yamazaki | B60K 6/445 60/284 |
| 2009/0258280 | A1* | 10/2009 | Ishikura | B60K 6/34 429/50 |
| 2012/0016549 | A1* | 1/2012 | Katsumata | B60K 6/46 701/22 |
| 2012/0150374 | A1* | 6/2012 | Yamazaki | B60K 6/365 701/22 |
| 2012/0226406 | A1* | 9/2012 | Kaita | B60K 6/445 701/22 |
| 2012/0234123 | A1* | 9/2012 | Whitney | F16H 61/143 74/473.1 |
| 2013/0158766 | A1* | 6/2013 | Okuda | B60K 6/48 701/22 |
| 2013/0169239 | A1* | 7/2013 | Iida | H02J 7/1492 320/162 |
| 2013/0253747 | A1* | 9/2013 | Amano | B60K 6/445 701/22 |
| 2014/0365057 | A1* | 12/2014 | Arita | B60W 20/12 701/22 |
| 2015/0149009 | A1* | 5/2015 | Michikoshi | B60K 6/48 701/22 |
| 2015/0239463 | A1* | 8/2015 | Ohmura | B60W 20/20 701/22 |
| 2015/0314776 | A1* | 11/2015 | Yu | B60W 20/40 701/22 |
| 2015/0314778 | A1* | 11/2015 | Matsui | F02D 29/02 701/22 |
| 2015/0321660 | A1* | 11/2015 | Kanayama | B60W 20/40 701/22 |
| 2016/0252069 | A1* | 9/2016 | Teraya | B60W 20/00 |
| 2016/0288784 | A1* | 10/2016 | Teraya | B60K 6/445 |
| 2017/0008508 | A1* | 1/2017 | Sato | B60W 10/06 |
| 2017/0008509 | A1* | 1/2017 | Sato | B60W 20/13 |

* cited by examiner

ENGINE START SUPPRESSION FOR A HYBRID CAR

INCORPORATION BY REFERENCE

The disclosure of Japanese Patent Application No. 2015-135101 filed on Jul. 6, 2015 including the specification, drawings and abstract is incorporated herein by reference in its entirety.

BACKGROUND

1. Technical Field

The present disclosure relates to a hybrid car and, more particularly, to a hybrid car that is provided with an engine, a motor, and a battery.

2. Description of Related Art

In the related art, a hybrid car that is configured to be provided with an engine and a motor generator for traveling and an electric power storage device which exchanges electric power with the motor generator and controls the engine and the motor generator for traveling in a charge depleting (CD) mode or a charge sustaining (CS) mode is known as this type of hybrid car (for example, refer to Japanese Patent Application Publication No. 2011-57116 (JP 2011-57116 A)). This hybrid car travels in the CD mode in a case where the electric power storage device has a remaining capacity exceeding a predetermined amount after the traveling is initiated. The hybrid car travels with the CD mode switched to the CS mode once the remaining capacity of the electric power storage device reaches the predetermined amount.

SUMMARY

In general, the CD mode of such hybrid cars is a traveling mode in which electric traveling is given more priority over hybrid traveling than in the CS mode, the hybrid traveling being traveling entailing an operation of the engine and the electric traveling being traveling entailing no operation of the engine. Accordingly, engine start suppression in the CD mode has been called for. The engine is likely to be started when, for example, a maximum battery output is relatively low or a maximum motor output is relatively low in the CD mode. Accordingly, some measures need to be taken when the engine is likely to be started in the CD mode.

Engine start suppression is a main object of the hybrid car according to the present disclosure.

The hybrid car according to the present disclosure adopts the following means in order to achieve the main object described above.

A hybrid car according to a first aspect of the present disclosure includes an engine (22) configured to output power for traveling, a motor (MG2) configured to output power for traveling, a battery (50) configured to exchange electric power with the motor, and an electronic control unit (24, 40, 70) configured to i) control the engine and the motor for traveling in accordance with a required output for traveling with respect to an accelerator operation amount in one of a charge depleting mode and a charge sustaining mode, ii) start the engine (22) and make a transition to hybrid traveling, which is traveling entailing an operation of the engine (22), when the required output becomes equal to or higher than a threshold during electric traveling as traveling not entailing the operation of the engine (22), and iii) set the required output such that the required output at a time when at least one of predetermined conditions is satisfied falls short of the required output at a time when the at least one of predetermined conditions is not satisfied with respect to the same accelerator operation amount during the electric traveling in the charge depleting mode, in which the predetermined conditions include a condition that an electric power storage ratio of the battery (50) falls short of a predetermined ratio, a condition that a temperature of the battery (50) falls short of a first predetermined temperature, a condition that a maximum allowable output of the battery (50) falls short of a first predetermined output, a condition that a temperature of the motor (MG2) is higher than a second predetermined temperature, and a condition that a positive-side maximum allowable output of the motor (MG2) falls short of a second predetermined output.

In this hybrid car according to the first aspect of the present disclosure, the electronic control unit controls the engine and the motor for the traveling in accordance with the required output for traveling with respect to the accelerator operation amount in one of the charge depleting (CD) mode and the charge sustaining (CS) mode. In addition, the electronic control unit starts the engine and makes the transition to the hybrid traveling, which is the traveling entailing the operation of the engine, when the required output becomes equal to or higher than the threshold during the electric traveling as the traveling not entailing the operation of the engine. Furthermore, the electronic control unit sets the required output such that the required output at the time when at least one of the predetermined conditions is satisfied falls short of the required output at the time when the at least one of predetermined conditions is not satisfied with respect to the same accelerator operation amount during the electric traveling in the CD mode, the predetermined conditions including the condition that the electric power storage ratio of the battery falls short of the predetermined ratio, the condition that the temperature of the battery falls short of the first predetermined temperature, the condition that the maximum allowable output of the battery falls short of the first predetermined output, the condition that the temperature of the motor is higher than the second predetermined temperature, and the condition that the positive-side maximum allowable output of the motor falls short of the second predetermined output. Herein, the predetermined conditions refer to conditions on which the engine is likely to be started. It is conceivable that the engine is likely to be started because of the low maximum allowable output of the battery with regard to the electric power storage ratio, temperature, and maximum allowable output of the battery and the engine is likely to be started because of the low maximum allowable output of the motor with regard to the temperature and maximum allowable output of the motor. Accordingly, by the required output being set as described above, the required output can be reduced, compared to the setting of the same required output as in the non-satisfaction of the at least one of predetermined conditions, when the at least one of predetermined conditions is satisfied (when the engine is likely to be started) during the electric traveling in the CD mode, and thus the required output can be inhibited from becoming equal to or higher than the threshold. As a result, a start of the engine in the CD mode can be suppressed. Herein, the CD mode is a traveling mode in which the electric traveling is given more priority over the hybrid traveling than in the CS mode.

In this hybrid car according to the first aspect of the present disclosure, the electronic control unit (24, 40, 70) may be configured to set the required output such that the required output at a time when the at least one of predetermined conditions is satisfied during the electric traveling in the charge depleting mode is equal to or higher than the required output during the electric traveling in the charge sustaining mode with respect to the same accelerator operation amount. Then, the engine becomes less likely to be started, by the required output being reduced with the value at the time of the electric traveling in the CS mode serving as a lower limit, when the at least one of predetermined conditions is satisfied (when the engine is likely to be started) during the electric traveling in the CD mode.

In this hybrid car according to the first aspect of the present disclosure, the electronic control unit (24, 40, 70) may be configured to set the required output such that the required output at the time when the at least one of predetermined conditions is satisfied during the electric traveling in the charge depleting mode is equal to the required output during the electric traveling in the charge sustaining mode with respect to the same accelerator operation amount. Then, the engine becomes less likely to be started, by the required output being reduced to the value at the time of the electric traveling in the CS mode, when the at least one of predetermined conditions is satisfied (when the engine is likely to be started) during the electric traveling in the CD mode.

In this hybrid car according to the first aspect of the present disclosure, the electronic control unit (24, 40, 70) may be configured to set the threshold at a time of the charge depleting mode to exceed the threshold at a time of the charge sustaining mode. Then, the engine becomes less likely to be started at the time of the CD mode.

In a hybrid car according to a second aspect of the present disclosure, the electronic control unit (24, 40, 70B) is configured to i) start the engine (22) and make the transition to the hybrid traveling, which is the traveling entailing the operation of the engine (22), when the required output becomes equal to or higher than a first threshold during the electric traveling, which is the traveling not entailing the operation of the engine (22), in the charge sustaining mode, ii) start the engine (22) and make the transition to the hybrid traveling when the required output becomes equal to or higher than a second threshold, which is higher than the first threshold, during the electric traveling in the charge depleting mode, iii) set the required output such that the required output at a time of the charge depleting mode exceeds the required output at a time of the charge sustaining mode with respect to the same accelerator operation amount during the electric traveling, and iv) make a transition to the charge sustaining mode when at least one of the predetermined conditions is satisfied and a difference between the required output in the charge depleting mode and the required output in the charge sustaining mode with respect to the accelerator opening degree at that point in time exceeds a difference between the second threshold and the first threshold during the electric traveling in the charge depleting mode.

In this hybrid car according to the second aspect of the present disclosure, the electronic control unit controls the engine and the motor for the traveling in accordance with the required output for traveling with respect to the accelerator operation amount in the charge depleting (CD) mode or the charge sustaining (CS) mode. In addition, the electronic control unit starts the engine and makes the transition to the hybrid traveling, which is the traveling entailing the operation of the engine, when the required output becomes equal to or higher than the first threshold during the electric traveling, which is the traveling not entailing the operation of the engine, in the CS mode, and the electronic control unit starts the engine and makes the transition to the hybrid traveling when the required output becomes equal to or higher than the second threshold, which is higher than the first threshold, during the electric traveling in the CD mode.

Furthermore, the electronic control unit sets the required output such that the required output at the time of the CD mode exceeds the required output at the time of the CS mode with respect to the same accelerator operation amount during the electric traveling. Moreover, the electronic control unit makes the transition to the CS mode when at least one of the predetermined conditions is satisfied and the difference between the required output in the CD mode and the required output in the CS mode with respect to the accelerator opening degree at that point in time exceeds the difference between the second threshold and the first threshold during the electric traveling in the CD mode, the predetermined conditions including the condition that the electric power storage ratio of the battery falls short of the predetermined ratio, the condition that the temperature of the battery falls short of the first predetermined temperature, the condition that the maximum allowable output of the battery falls short of the first predetermined output, the condition that the temperature of the motor is higher than the second predetermined temperature, and the condition that the positive-side maximum allowable output of the motor falls short of the second predetermined output. Herein, the predetermined conditions refer to conditions on which the engine is likely to be started. It is conceivable that the engine is likely to be started because of the low maximum allowable output of the battery with regard to the electric power storage ratio, temperature, and maximum allowable output of the battery and the engine is likely to be started because of the low maximum allowable output of the motor with regard to the temperature and maximum allowable output of the motor. Accordingly, when the predetermined at least one of conditions is satisfied (the engine is likely to be started) and the difference between the required output in the CD mode and the required output in the CS mode with respect to the accelerator opening degree at that point in time exceeds the difference between the second threshold and the first threshold during the electric traveling in the CD mode, the required output can be reduced by an amount larger than the difference between the second threshold and the first threshold compared to a non-transition to the CS mode. As a result, the start of the engine can be suppressed. Herein, the CD mode is a traveling mode in which the electric traveling is given more priority over the hybrid traveling than in the CS mode (the second threshold exceeding the first threshold is used).

In this hybrid car according to the second aspect of the present disclosure, the electronic control unit (24, 40, 70B) may be configured to maintain the charge sustaining mode when the at least one of predetermined conditions is satisfied and the difference between the required output in the charge depleting mode and the required output in the charge sustaining mode with respect to the accelerator opening degree at that point in time exceeds the difference between the second threshold and the first threshold while a request for a transition to the charge depleting mode is made during the electric traveling in the charge sustaining mode. Then, an increase in the required output by the amount larger than the difference between the second threshold and the first threshold can be avoided unlike in a transition to the CD mode in response to a request for the transition to the CD mode. As a result, the start of the engine can be suppressed.

The hybrid car according to the first or second aspect of the present disclosure may also be provided with a generator that is capable of exchanging electric power with the battery and a planetary gear that has three rotating elements connected to a drive shaft which is connected to an axle, an output shaft of the engine, and a rotary shaft of the generator.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described by the use of examples.

Figure 1:
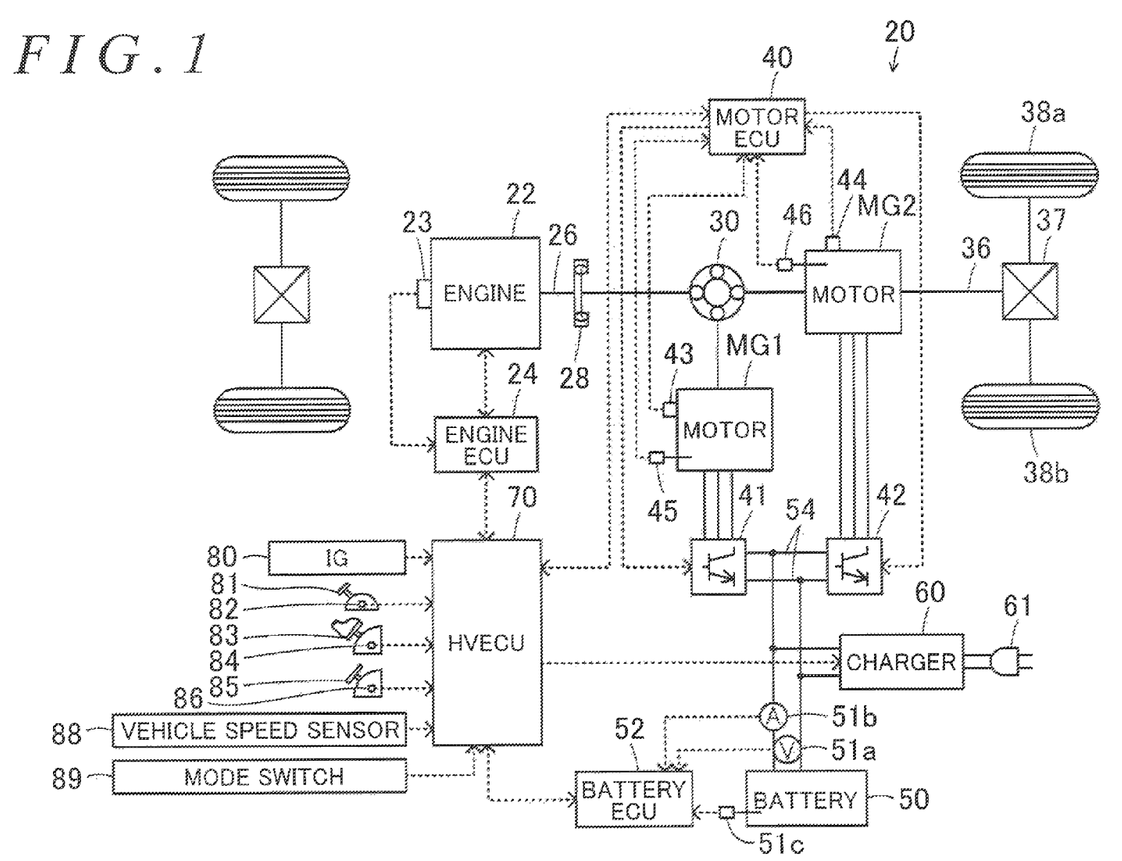
FIG. 1 is a configuration diagram schematically illustrating a configuration of a hybrid car 20 as a first example of the present disclosure.

FIG. 1 is a configuration diagram schematically illustrating a configuration of a hybrid car 20 as a first example of the present disclosure. As illustrated in the drawing, the hybrid car 20 according to the first example is provided with an engine 22, a planetary gear 30, motors MG1, MG2, inverters 41, 42, a battery 50, a charger 60, and an electronic control unit for hybrid (hereinafter, referred to as a "HVECU") 70.

The engine 22 is configured as an internal combustion engine that outputs power by using gasoline, diesel oil, or the like as a fuel. An operation of this engine 22 is controlled by an electronic control unit for the engine (hereinafter, referred to as an "engine ECU") 24.

The engine ECU 24 is configured as a microprocessor that has a CPU (not illustrated) as its main component. The engine ECU 24 is provided with not only the CPU but also a ROM that stores a processing program, a RAM that temporarily stores data, input and output ports, and a communication port. Signals from various sensors that are required for the operation of the engine 22 to be controlled are input to the engine ECU 24 from the input port. Examples of the signals that are input to the engine ECU 24 can include the followings. —A crank angle θcr from a crank position sensor 23 that detects a rotational position of a crankshaft 26 of the engine 22. —A throttle opening degree TH from a throttle valve position sensor that detects a position of a throttle valve.

Various control signals for the operation of the engine 22 to be controlled are output from the engine ECU 24 via the output port. Examples of the control signals that are output from the engine ECU 24 can include the followings. —A control signal to a throttle motor that regulates the position of the throttle valve. —A control signal to a fuel injection valve. —A control signal to an ignition coil that is integrated with an igniter.

The engine ECU 24 is connected to the HVECU 70 via the communication port. The engine ECU 24 controls the operation of the engine 22 based on a control signal from the HVECU 70 and, if necessary, outputs data relating to an operation state of the engine 22 to the HVECU 70. The engine ECU 24 calculates a rotation speed of the crankshaft 26, that is, a rotation speed Ne of the engine 22, based on the crank angle θcr from the crank position sensor 23.

The planetary gear 30 is configured as a single pinion-type planetary gear mechanism. A rotor of the motor MG1 is connected to a sun gear of the planetary gear 30. A drive shaft 36, which is connected to drive wheels 38a, 38b via a differential gear 37, is connected to a ring gear of the planetary gear 30. The crankshaft 26 of the engine 22 is connected to a carrier of the planetary gear 30 via a damper 28.

The motor MG1 is configured as, for example, a synchronous generator motor. As described above, the rotor of the motor MG1 is connected to the sun gear of the planetary gear 30. The motor MG2 is configured as, for example, a synchronous generator motor. A rotor of the motor MG2 is connected to the drive shaft 36. The inverters 41, 42 are connected to the battery 50 via an electric power line 54. The motors MG1, MG2 are driven to rotate by a plurality of switching elements (not illustrated) of the inverters 41, 42 being subjected to a switching control by an electronic control unit for the motors (hereinafter, referred to as a "motor ECU") 40.

The motor ECU 40 is configured as a microprocessor that has a CPU (not illustrated) as its main component. The motor ECU 40 is provided with not only the CPU but also a ROM that stores a processing program, a RAM that temporarily stores data, input and output ports, and a communication port. Signals from various sensors that are required for the driving of the motors MG1, MG2 to be controlled are input to the motor ECU 40 via the input port. Examples of the signals that are input to the motor ECU 40 can include the followings. —Rotational positions θm1, θm2 from rotational position detection sensors 43, 44 that detect rotational positions of the rotors of the motors MG1, MG2. —A phase current from a current sensor that detects a current flowing in each phase of the motors MG1. MG2. —Temperatures Tmg1, Tmg2 of the motors MG1, MG2 from temperature sensors 45, 46 that detect temperatures of the motors MG1, MG2.

Switching control signals or the like are output from the motor ECU 40 to the plurality of switching elements (not illustrated) of the inverters 41, 42 via the output port. The motor ECU 40 is connected to the HVECU 70 via the communication port. The motor ECU 40 controls the driving of the motors MG1, MG2 based on a control signal from the HVECU 70 and, if necessary, outputs data relating to driving states of the motors MG1, MG2 to the HVECU 70. The motor ECU 40 calculates rotation speeds Nm1, Nm2 of the motors MG1, MG2 based on the rotational positions θm1, θm2 of the rotors of the motors MG1, MG2 from the rotational position detection sensors 43, 44.

The battery 50 is configured as, for example, a lithium-ion secondary battery or a nickel-hydrogen secondary battery. As described above, this battery 50 is connected to the inverters 41, 42 via the electric power line 54. The battery 50 is managed by an electronic control unit for the battery (hereinafter, referred to as a "battery ECU") 52.

The battery ECU 52 is configured as a microprocessor that has a CPU (not illustrated) as its main component. The battery ECU 52 is provided with not only the CPU but also a ROM that stores a processing program, a RAM that temporarily stores data, input and output ports, and a communication port. Signals from various sensors that are required for the management of the battery 50 are input to the battery ECU 52 via the input port. Examples of the signals that are input to the battery ECU 52 can include the followings. —A battery voltage Vb from a voltage sensor 51a that is installed between terminals of the battery 50. —A battery current Ib from a current sensor 51b that is attached to an output terminal of the battery 50. —A battery temperature Tb from a temperature sensor 51c that is attached to the battery 50.

The battery ECU 52 is connected to the HVECU 70 via the communication port. If necessary, the battery ECU 52 outputs data relating to a state of the battery 50 to the HVECU 70. The battery ECU 52 calculates an electric power storage ratio SOC based on an integrated value of the battery current 1b from the current sensor 51b. The electric power storage ratio SOC is a ratio of a capacity of electric power that can be discharged from the battery 50 to a full capacity of the battery 50. In addition, the battery ECU 52 calculates input and output limits Win, Wout based on the calculated electric power storage ratio SOC and the battery temperature Tb from the temperature sensor 51c. The input and output limits Win, Wout are maximum allowable electric power for charging and discharging of the battery 50. The input limit Win is set to a predetermined value Win1 (for example, approximately −60 kW to −70 kW), within a range of up to value 0, when the battery temperature Tb is equal to or higher than a threshold Tblo (such as −5° C., 0° C., and 5° C.) and the electric power storage ratio SOC is equal to or lower than a threshold Shi (such as 60%, 65%, and 70%). When the battery temperature Tb is lower than the threshold Tblo, the input limit Win is set to increase (its absolute value decreasing) as the battery temperature Tb decreases compared to when the battery temperature Tb is equal to or higher than the threshold Tblo. When the electric power storage ratio SOC is higher than the threshold Shi, the input limit Win is set to increase (its absolute value decreasing) as the electric power storage ratio SOC increases compared to when the electric power storage ratio SOC is equal to or lower than the threshold Shi. The output limit Wout is set to a predetermined value Wout1 (for example, approximately 60 kW to 70 kW), within a range of at least value 0, when the battery temperature Tb is equal to or higher than the threshold Tblo and the electric power storage ratio SOC is equal to or higher than a threshold Slo (such as 40%, 45%, and 50%). When the battery temperature Tb is lower than the threshold Tblo, the output limit Wout is set to decrease as the battery temperature Tb decreases compared to when the battery temperature Tb is equal to or higher than the threshold Tblo. When the electric power storage ratio SOC is lower than the threshold Slo, the output limit Wout is set to decrease as the electric power storage ratio SOC decreases compared to when the electric power storage ratio SOC is equal to or higher than the threshold Slo.

The charger 60 is connected to the electric power line 54. The charger 60 is configured to be capable of charging the battery 50 with electric power from an external electric power source when an electric power source plug 61 is connected to the external electric power source such as a household electric power source. This charger 60 is provided with an AC/DC converter and a DC/DC converter. The AC/DC converter converts AC electric power from the external electric power source that is supplied via the electric power source plug 61 to DC electric power. The DC/DC converter converts a voltage of the DC electric power from the AC/DC converter and supplies it to the battery 50 side. This charger 60 supplies the battery 50 with the electric power from the external electric power source by the AC/DC converter and the DC/DC converter being controlled by the HVECU 70 when the electric power source plug 61 is connected to the external electric power source.

The HVECU 70 is configured as a microprocessor that has a CPU (not illustrated) as its main component. The HVECU 70 is provided with not only the CPU but also a ROM that stores a processing program, a RAM that temporarily stores data, input and output ports, and a communication port. Signals from various sensors are input to the HVECU 70 via the input port. Examples of the signals that are input to the HVECU 70 can include the followings. —An ignition signal from an ignition switch 80. —A shift position SP from a shift position sensor 82 that detects an operation position of a shift lever 81. —An accelerator opening degree Acc from an accelerator pedal position sensor 84 that detects a depression amount of an accelerator pedal 83. —A brake pedal position BP from a brake pedal position sensor 86 that detects a depression amount of a brake pedal 85. —A vehicle speed V from a vehicle speed sensor 88. —A mode instruction signal Smd from a mode switch 89 for an instruction on a charge sustaining (CS) mode or a charge depleting (CD) mode in which electric traveling (EV traveling) is given more priority than in the CS mode out of hybrid traveling (HV traveling) for traveling entailing the operation of the engine 22 and the EV traveling for traveling not entailing the operation of the engine 22.

A control signal or the like is output from the HVECU 70 to the charger 60 via the output port. As described above, the HVECU 70 is connected to the engine ECU 24, the motor ECU 40, and the battery ECU 52 via the communication ports, and exchanges various controls signals and data with the engine ECU 24, the motor ECU 40, and the battery ECU 52.

In the hybrid car 20 according to the first example that has the configuration described above, the HV traveling or the EV traveling is performed in the CD mode or the CS mode.

At a time of the HV traveling in the CD mode or the CS mode, the HVECU 70 sets a required torque Tr* required for the traveling first. A method for setting the required torque Tr* will be described later. Then, the HVECU 70 calculates a power Pr* for the traveling required for the traveling by multiplying the required torque Tr* by a rotation speed Nr of the drive shaft 36. The rotation speed Nm2 of the motor MG2, a rotation speed that is obtained by the vehicle speed V being multiplied by a conversion factor, or the like can be used as the rotation speed Nr of the drive shaft 36.

Subsequently, the HVECU 70 calculates a required power Pe* that is required for the vehicle by subtracting a charging and discharging power demand Pb* of the battery 50 (positive value at a time of the discharging of the battery 50) from the power Pr* for the traveling. At a time of the CS mode, the charging and discharging power demand Pb* is set to value 0 when the electric power storage ratio SOC of the battery 50 is a target ratio SOC* (such as a predetermined value and the electric power storage ratio SOC at a time of switching from the CD mode), is set to a negative value (value for charging) when the electric power storage ratio SOC is lower than the target ratio SOC*, and is set to a positive value (value for discharging) when the electric power storage ratio SOC is higher than the target ratio SOC*. At a time of the CD mode, the charging and discharging power demand Pb* is set to value 0 regardless of the electric power storage ratio SOC.

Then, the HVECU 70 sets a target rotation speed Ne* and a target torque Te* of the engine 22 by using the required power Pe* and an operation line for an efficient operation of the engine 22. Subsequently, the HVECU 70 sets a torque command Tm1* of the motor MG1, within a range of the input and output limits Win, Wout of the battery 50 and a torque limit of the motor MG2 (±Tm2lim), by a rotation speed feedback control for causing the rotation speed Ne of the engine 22 to become the target rotation speed Ne* and sets a torque command Tm2* of the motor MG2 such that the required torque Tr* is output to the drive shaft 36. The torque limit of the motor MG2 (±Tm2lim) is upper and lower limits of the torque that may be output from the motor MG2. The torque limit of the motor MG2 (±Tm2lim) is set to a rated torque of the motor MG2 (±Tm2rt) when the temperature Tmg2 of the motor MG2 is equal to or lower than a threshold Tmg2hi (such as 120° C., 130° C., and 140° C.) and, when the temperature Tmg2 is higher than the threshold Tmg2hi, is set for its absolute value to decrease as the temperature Tmg2 increases compared to when the temperature Tmg2 is equal to or lower than a threshold Tmg2ref. This is to suppress overheating of the motor MG2.

Then, the HVECU 70 transmits the target rotation speed Ne* and the target torque Te* of the engine 22 to the engine ECU 24 and transmits the torque commands Tm1*, Tm2* of the motors MG1, MG2 to the motor ECU 40. After receiving the target rotation speed Ne* and the target torque Te* of the engine 22, the engine ECU 24 performs a suctioned air amount control, a fuel injection control, an ignition control, and the like on the engine 22 such that the engine 22 is operated based on the received target rotation speed Ne* and target torque Te*. After receiving the torque commands Tm1*, Tm2* of the motors MG1, MG2, the motor ECU 40 performs the switching control on the plurality of switching elements of the inverters 41, 42 such that the motors MG1, MG2 are driven in compliance with the torque commands Tm1*, Tm2*.

When a stop condition of the engine 22 is satisfied during the HV traveling in the CD mode or the CS mode, the operation of the engine 22 is stopped and the hybrid car 20 is subjected to a transition to the EV traveling. Examples of the stop condition of the engine 22 can include the following (I) and (II). In the first example, it is determined that the stop condition of the engine 22 is satisfied when all of the following conditions are satisfied. (I) A condition that the required torque Tr* falls short of a threshold Trref. (II) A condition that the required power Pe* falls short of a threshold Peref.

At a time of the EV traveling in the CD mode or the CS mode, the HVECU 70 sets the required torque Tr* first. Then, the HVECU 70 sets value 0 as the torque command Tm1* of the motor MG1 and sets the torque command Tm2* of the motor MG2 such that the required torque Tr* is output to the drive shaft 36 within the range of the input and output limits Win, Wout of the battery 50 and the torque limit of the motor MG2 (±Tm2lim). Then, the HVECU 70 transmits the torque commands Tm1*, Tm2* of the motors MG1, MG2 to the motor ECU 40. After receiving the torque commands Tm1*, Tm2* of the motors MG1, MG2, the motor ECU 40 performs the switching control on the switching elements of the inverters 41, 42 such that the motors MG1, MG2 are driven in compliance with the torque commands Tm1*, Tm2*. At this time, the calculation of the required power Pe* and the like is also performed as at the time of the HV traveling.

When a start condition of the engine 22 is satisfied during the EV traveling in the CD mode or the CS mode, the engine 22 is started and the hybrid car 20 is subjected to a transition to the HV traveling. In the first example, it is determined that the start condition of the engine 22 is satisfied when at least one of the stop conditions of the engine 22 (conditions of (I) and (II)) is not satisfied. The stop and start conditions of the engine 22 are not limited to the conditions of (I) and (II).

In the first example, the EV traveling takes precedence over the HV traveling (the engine 22 is made less likely to start) at a time of the CD mode compared to at a time of the CS mode by, for example, the threshold Trref and the threshold Peref becoming higher in the CD mode than in the CS mode. Specifically, the HVECU 70 sets a value Trref1 as the threshold Trref in the CS mode and sets a value Trref2, which exceeds the value Trref1, as the threshold Trref in the CD mode. Examples of the value that can be used as the value Trref2 include the torque limit Tm2lim of the motor MG2 (the rated torque Tm2rt exceeding the value Trref1) that is lower limit-guarded with a value slightly exceeding the value Trref1. In addition, the HVECU 70 sets a value Peref1 as the threshold Peref in the CS mode and sets a value Peref2, which exceeds the value Peref1, as the threshold Peref in the CD mode. Examples of the value that can be used as the value Peref2 include the output limit Wout of the battery 50 (the predetermined value Wout1 exceeding the value Peref1) that is lower limit-guarded with a value slightly exceeding the predetermined value Peref1.

Furthermore, in the hybrid car 20 according to the first example, the HVECU 70 controls the charger 60 for the battery 50 to be charged with the electric power from the external electric power source when the electric power source plug 61 is connected to the external electric power source while the system is OFF at one's home or a charging point set in advance. Then, when the system has started, the hybrid car 20 travels in the CD mode until the electric power storage ratio SOC of the battery 50 becomes equal to or lower than a threshold Shv2 (such as 25%, 30%, and 35%) when the electric power storage ratio SOC of the battery 50 is equal to or higher than a threshold Shv1 (such as 45%, 50%, and 55%) and travels in the CS mode once the electric power storage ratio SOC of the battery 50 becomes equal to or lower than the threshold Shv2. The hybrid car 20 travels in the CS mode when the system has started with the electric power storage ratio SOC of the battery 50 falling short of the threshold Shv1.

Figure 2:
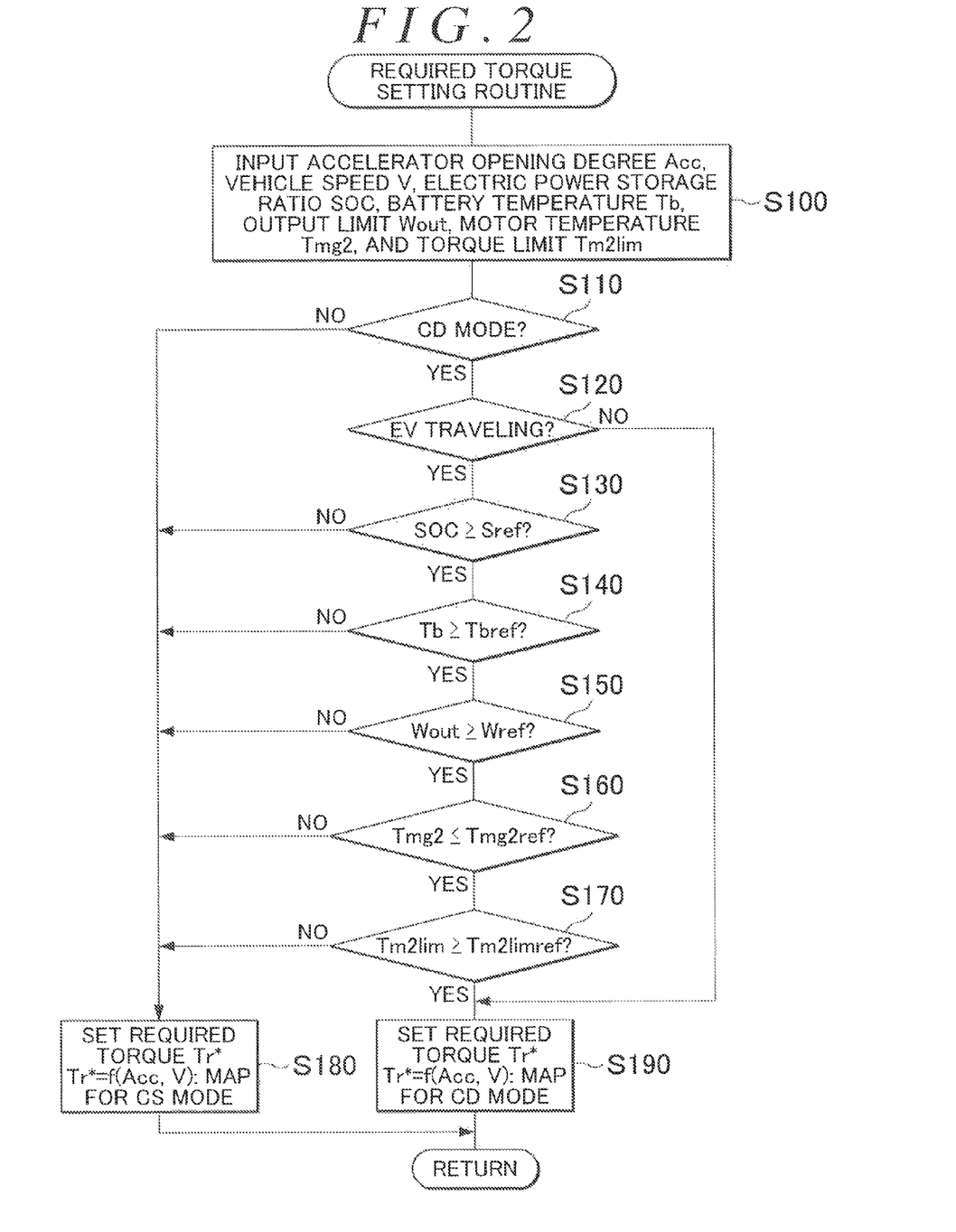
FIG. 2 is a flowchart illustrating an example of a required torque setting routine that is executed by a HVECU 70 of the first example.

Hereinafter, an operation of the hybrid car 20 according to the first example that is configured as described above, an operation during the setting of the required torque Tr* in particular, will be described. FIG. 2 is a flowchart illustrating an example of a required torque setting routine that is executed by the HVECU 70 of the first example. This routine is repeatedly executed at predetermined time intervals (such as several msec).

Once the required torque setting routine is executed, the HVECU 70 first inputs data such as the accelerator opening degree Acc, the vehicle speed V, the battery temperature Tb of the battery 50, the electric power storage ratio SOC, the output limit Wout, and the torque limit Tm2lim of the motor MG2 (Step S100). Herein, a value that is detected by the accelerator pedal position sensor 84 is input as the accelerator opening degree Acc. A value that is detected by the vehicle speed sensor 88 is input as the vehicle speed V. A value that is detected by the temperature sensor 51c is input as the battery temperature Tb of the battery 50 by communication and from the battery ECU 52. Values that are calculated by the battery ECU 52 are input by communication as the electric power storage ratio SOC and the output limit Wout of the battery 50. A value that is detected by the temperature sensor 46 is input as the torque limit Tm2lim of the motor MG2 by communication and from the motor ECU 40.

Figure 3:
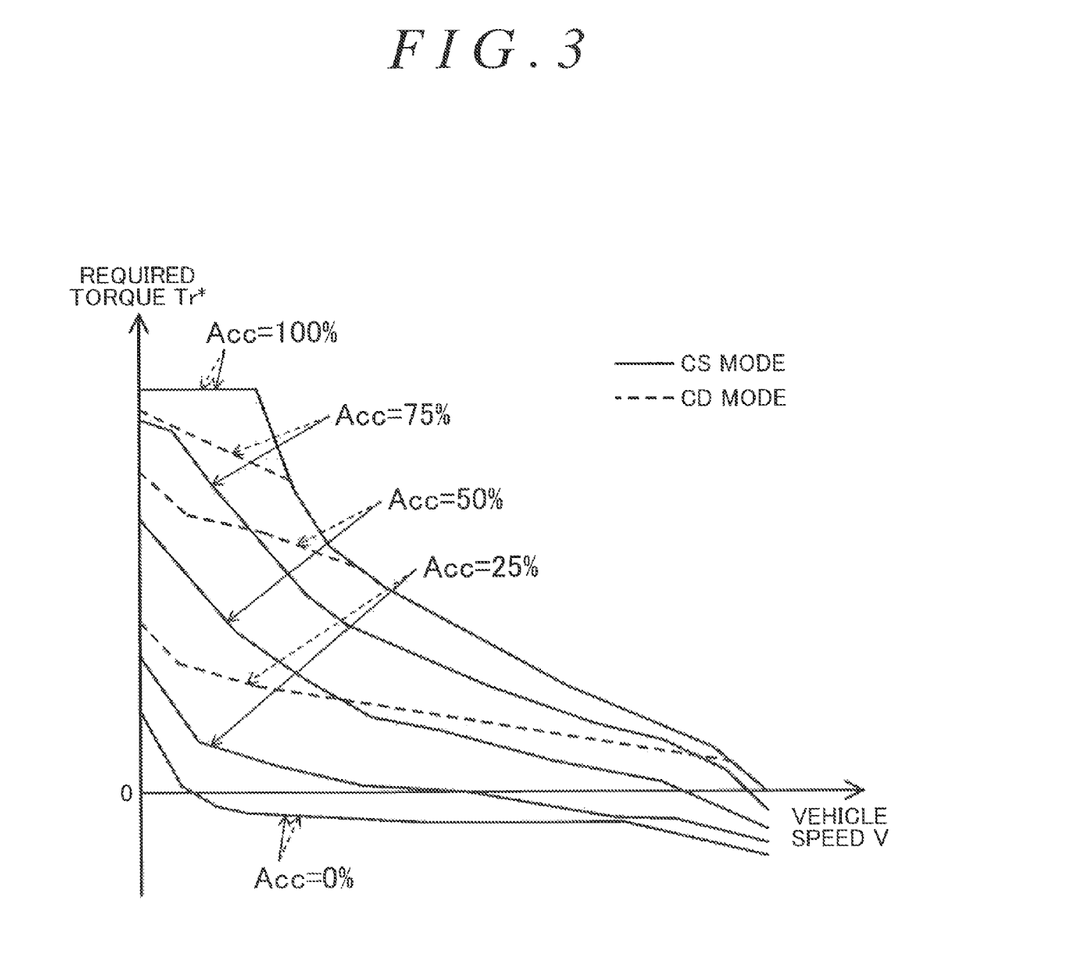
FIG. 3 is an explanatory diagram illustrating an example of a map for a CS mode and an example of a map for a CD mode.

After the data input, the HVECU 70 determines whether the traveling mode is the CD mode or the CS mode (Step S110). When it is determined that the traveling mode is the CS mode, the HVECU 70 sets the required torque Tr* based on a map for the CS mode, the accelerator opening degree Acc, and the vehicle speed V (Step S180) and terminates this routine. The map for the CS mode and a map for the CD mode (described later) are maps showing a relationship among the accelerator opening degree Acc, the vehicle speed V, and the required torque Tr*. An example of these maps is illustrated in FIG. 3. The solid lines in the drawing represent an example of the relationship among the accelerator opening degree Acc, the vehicle speed V, and the required torque Tr* in the map for the CS mode while the dashed lines in the drawing represent an example of the relationship among the accelerator opening degree Acc, the vehicle speed V, and the required torque Tr* in the map for the CD mode. As illustrated in FIG. 3, the map for the CD mode and the map for the CS mode are set such that the required torque Tr* in the map for the CD mode is higher than the required torque Tr* in the map for the CS mode with respect to the same accelerator opening degree Acc and the same vehicle speed V. This is based on that the CD mode is a traveling mode in which the EV traveling is given more priority over the HV traveling than in the CS mode and that a driver is less likely to feel a sense of acceleration at a time of acceleration during the EV traveling because the rotation speed Ne of the engine 22 does not rise at the time of the acceleration during the EV traveling.

When it is determined in Step S110 that the traveling mode is the CD mode, the HVECU 70 determines whether the EV traveling is in progress or the HV traveling is in progress (Step S120). Once the HVECU 70 determines that the HV traveling is in progress, this routine is terminated after the required torque Tr* is set based on the map for the CD mode, the accelerator opening degree Acc, and the vehicle speed V (Step S190). In this manner, the sense of acceleration at the time of the acceleration can be enhanced.

Once the HVECU 70 determines in Step S120 that the EV traveling is in progress, the electric power storage ratio SOC of the battery 50 is compared to a threshold Sref (Step S130), the battery temperature Tb of the battery 50 is compared to a threshold Tbref (Step S140), the output limit Wout of the battery 50 is compared to a threshold Wref (Step S150), the temperature Tmg2 of the motor MG2 is compared to the threshold Tmg2ref (Step S160), and the positive-side torque limit Tm2lim of the motor MG2 is compared to a threshold Tm2limref (Step S170). The threshold Sref, the threshold Tbref the threshold Wref, the threshold Tmg2ref, and the threshold Tm2limref are thresholds that are used in determining whether or not the engine 22 is in a state where the engine 22 is likely to be started during the EV traveling in the CD mode. For example, a value that is lower by approximately several percent to 10% than the threshold Slo described above can be used as the threshold Sref. Values that are lower by approximately several degrees Celsius to 10° C. than the threshold Tblo described above can be used as the threshold Tbref. Values that are lower by approximately 5 kW to 10 kW than the predetermined value Wout1 described above can be used as the threshold Wref. Values that are higher by approximately several degrees Celsius to 10° C. than the threshold Tmg2hi described above (such as 120° C., 130° C., and 140° C.) can be used as the threshold Tm2limref. Values that are approximately 0.8 times to 0.9 times of the positive-side rated torque Tm2rt of the motor MG2 described above can be used as the threshold Tm2limref. As described above, the electric power storage ratio SOC, the battery temperature Tb, and the output limit Wout of the battery 50 are related to one another and the temperature Tmg2 of the motor MG2 and the torque limit Tm2lim are related to each other. In addition, the engine 22 is likely to be started by the required power Pe* becoming equal to or higher than the threshold Peref when the electric power storage ratio SOC, the battery temperature Tb, and the output limit Wout are relatively low during the EV traveling in the CD mode, and the engine 22 is likely to be started by the required torque Tr* becoming equal to or higher than the threshold Trref when the temperature Tmg2 of the motor MG2 is relatively high and the torque limit Tm2lim of the motor MG2 is relatively low.

The HVECU 70 determines that the engine 22 is not in the state where the engine 22 is likely to be started when the electric power storage ratio SOC of the battery 50 is equal to or higher than the threshold Sref, the battery temperature Tb of the battery 50 is equal to or higher than the threshold Tbref, the output limit Wout of the battery 50 is equal to or higher than the threshold Wref, the temperature Tmg2 of the motor MG2 is equal to or higher than the threshold Tmg2ref, and the torque limit Tm2lim of the motor MG2 is equal to or higher than the threshold Tm2limref in Steps S130 to S170. Then, this routine is terminated after the required torque Tr* is set based on the map for the CD mode, the accelerator opening degree Acc, and the vehicle speed V (Step S190). In this manner, the sense of acceleration during the acceleration can be enhanced.

The HVECU 70 determines that the engine 22 is in the state where the engine 22 is likely to be started when the electric power storage ratio SOC of the battery 50 falls short of the threshold Sref, when the battery temperature Tb of the battery 50 falls short of the threshold Tbref, when the output limit Wout of the battery 50 falls short of the threshold Wref, when the temperature Tmg2 of the motor MG2 is higher than the threshold Tmg2ref, and when the torque limit Tm2lim of the motor MG2 falls short of the threshold Tm2limref in Steps S130 to S170. Then, this routine is terminated after the required torque Tr is set based on the map for the CS mode, the accelerator opening degree Acc, and the vehicle speed V (Step S180). Then, the required power Pe* can be reduced by the required torque Tr* being allowed to be lower than in the setting of the required torque Tr* by the use of the map for the CD mode, and the required power Pe* can be inhibited from becoming equal to or higher than the threshold Peref and the required torque Tr* can be inhibited from becoming equal to or higher than the threshold Trref. As a result, a start of the engine 22 in the CD mode can be suppressed. By the required torque Tr* being set by the use of the map for the CS mode at this time, the start of the engine 22 can be further suppressed than in the setting of a value between a value obtained by the use of the map for the CD mode and a value obtained by the use of the map for the CS mode as the required torque Tr*.

At the time of the EV traveling in the CD mode and in the hybrid car 20 according to the first example described above, the HVECU 70 determines that the engine 22 is in the state where the engine 22 is likely to be started when the electric power storage ratio SOC of the battery 50 falls short of the threshold Sref, when the battery temperature Tb of the battery 50 falls short of the threshold Tbref, when the output limit Wout of the battery 50 falls short of the threshold Wref, when the temperature Tmg2 of the motor MG2 is higher than the threshold Tmg2ref, and when the torque limit Tm2lim of the motor MG2 falls short of the threshold Tm2limref, and the HVECU 70 sets the required torque Tr* by using the map for the CS mode in which the required torque Tr* is set to be lower than in the map for the CD mode. Accordingly, the required power Pe* can be reduced by the required torque Tr* being allowed to be lower than in the setting of the required torque Tr* by the use of the map for the CD mode, and the required power Pe* can be inhibited from becoming equal to or higher than the threshold Peref and the required torque Tr* can be inhibited from becoming equal to or higher than the threshold Trref. As a result, the start of the engine 22 in the CD mode can be suppressed.

In the hybrid car 20 according to the first example, the HVECU 70 determines whether or not the engine 22 is in the state where the engine 22 is likely to be started by using the electric power storage ratio SOC, the battery temperature Tb, and the output limit Wout of the battery 50 and the torque limit Tm2lim of the motor MG2 at a time of the EV traveling in the CD mode. However, the HVECU 70 may also determine whether or not the engine 22 is in the state where the engine 22 is likely to be started by using some of these, for example, the output limit Wout and the torque limit Tm2lim.

In the hybrid car 20 according to the first example, the required torque Tr* is set by the use of the map for the CS mode when the engine 22 is in the state where the engine 22 is likely to be started during the EV traveling in the CD mode. However, a value that falls short of the value obtained by the use of the map for the CD mode (value at a time when the engine 22 is not in the state where the engine 22 is likely to be started during the EV traveling in the CD mode) and exceeds the value obtained by the use of the map for the CS mode can be set as the required torque Tr* as well. Then, the start of the engine 22 can be suppressed with the required torque Tr* being reduced within that range. In addition, a value that falls short of the value obtained by the use of the map for the CD mode and the value obtained by the use of the map for the CS mode may be set as the required torque Tr*, too.

Hereinafter, a hybrid car 20B according to a second example of the present disclosure will be described. The hybrid car 20B according to the second example has the same hardware configuration as the hybrid car 20 according to the first example that has been described with reference to FIG. 1, and the control that is performed on the hybrid car 20B according to the second example is identical to the control performed on the hybrid car 20 according to the first example except for methods for setting the traveling mode and the required torque Tr*. Accordingly, descriptions regarding the hardware configuration of the hybrid car 20B according to the second example and the like will be omitted so that repetitive descriptions can be avoided.

In the hybrid car 20B according to the second example, the required torque Tr* is set by the use of the map for the CS mode at a time of the CS mode and the required torque Tr* is set by the use of the map for the CD mode, in which the required torque Tr* is set to be higher than at the time of the CS mode, at a time of the CD mode.

In addition, in the hybrid car 20B according to the second example, a difference ΔTr between the required torque Tr* at the time of the CD mode and the required torque Tr* at the time of the CS mode exceeds a difference ΔTrref between the thresholds Trref (=Trref2−Trref1) and a difference ΔPe between the required power Pe* at the time of the CD mode and the required power Pe* at the time of the CS mode exceeds a difference ΔPeref between the thresholds Peref (=Peref2−Peref1) in an entire range of the accelerator opening degree Acc (0% to 100%) unlike in the first example.

Figure 4:
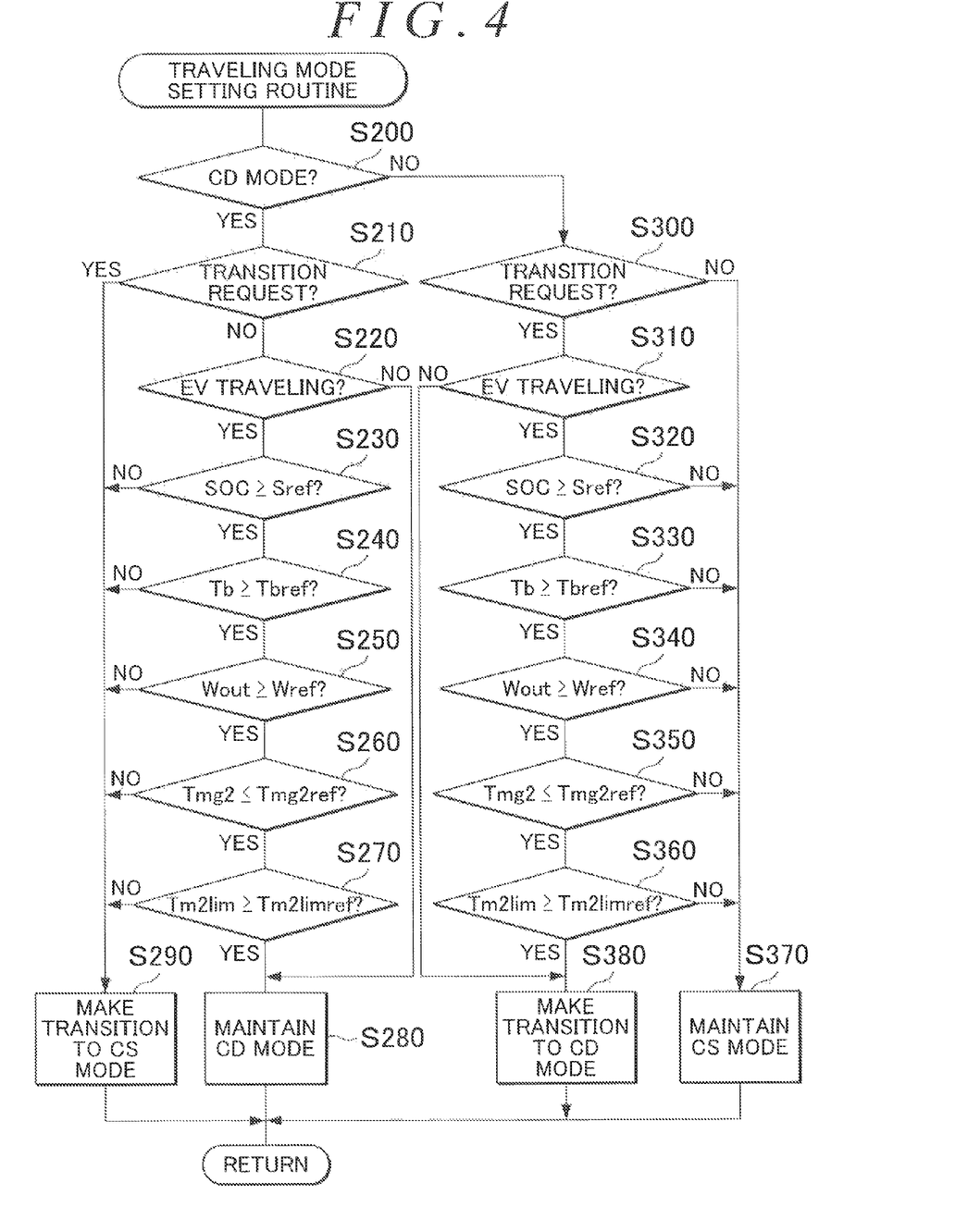
FIG. 4 is a flowchart illustrating an example of a traveling mode setting routine that is executed by a HVECU 70B of a second example.

Furthermore, in the hybrid car 20B according to the second example, a HVECU 70B sets the traveling mode based on a traveling mode setting routine illustrated in FIG. 4. This routine is repeatedly executed at predetermined time intervals (such as several msec).

Once the traveling mode setting routine is executed, the HVECU 70B first determines whether the current traveling mode is the CD mode or the CS mode (Step S200). Basically, in the second example, the traveling mode (CD mode or CS mode) is set in accordance with the electric power storage ratio SOC of the battery 50 at the time of the start of the system and the subsequent electric power storage ratio SOC of the battery 50 as in the first example.

Once it is determined that the current traveling mode is the CD mode, the HVECU 70B determines whether or not a transition to the CS mode has been requested (Step S210). A time when the electric power storage ratio SOC of the battery 50 has become equal to or lower than the threshold Shv2 and a time when the mode switch 89 has been operated are regarded as the time when the transition to the CS mode has been requested.

Once it is determined that the transition to the CS mode has not been requested, the HVECU 70B determines whether the EV traveling is in progress or the HV traveling is in progress (Step S220). When it is determined that the HV traveling is in progress, the traveling mode is maintained in the CD mode (Step S280), and then this routine is terminated.

Once the HVECU 70B determines in Step S220 that the EV traveling is in progress, the electric power storage ratio SOC of the battery 50 is compared to the threshold Sref (Step S230), the battery temperature Tb of the battery 50 is compared to the threshold Tbref (Step S240), the output limit Wout of the battery 50 is compared to the threshold Wref (Step S250), the temperature Tmg2 of the motor MG2 is compared to the threshold Tmg2ref (Step S260), and the positive-side torque limit Tm2lim of the motor MG2 is compared to the threshold Tm2limref (Step S270) as in the processing of Steps S130 to S170 according to the required torque setting routine illustrated in FIG. 2. The processing of Steps S230 to S270 is to determine whether or not the engine 22 is in the state where the engine 22 is likely to be started during the EV traveling in the CD mode.

The HVECU 70B determines that the engine 22 is not in the state where the engine 22 is likely to be started when the electric power storage ratio SOC of the battery 50 is equal to or higher than the threshold Sref, the battery temperature Tb of the battery 50 is equal to or higher than the threshold Tbref, the output limit Wout of the battery 50 is equal to or higher than the threshold Wref, the temperature Tmg2 of the motor MG2 is equal to or higher than the threshold Tmg2ref, and the torque limit Tm2lim of the motor MG2 is equal to or higher than the threshold Tm2limref in Steps S230 to S270. Then, this routine is terminated after the traveling mode is maintained in the CD mode (Step S280).

The HVECU 70B determines that the engine 22 is in the state where the engine 22 is likely to be started when the electric power storage ratio SOC of the battery 50 falls short of the threshold Sref, when the battery temperature Tb of the battery 50 falls short of the threshold Tbref, when the output limit Wout of the battery 50 falls short of the threshold Wref, when the temperature Tmg2 of the motor MG2 is higher than the threshold Tmg2ref, and when the torque limit Tm2lim of the motor MG2 falls short of the threshold Tm2limref in Steps S230 to S270. Then, this routine is terminated after the transition of the traveling mode from the CD mode to the CS mode (Step S290). In the second example, the difference ΔTr between the required torque Tr* at the time of the CD mode and the required torque Tr* at the time of the CS mode exceeds the difference ΔTrref between the thresholds Trref and the difference ΔPe between the required power Pe at the time of the CD mode and the required power Pe* at the time of the CS mode exceeds the difference ΔPeref between the thresholds Peref as described above. Accordingly, compared to the traveling mode being maintained in the CD mode, that is, a non-transition to the CS mode, the required torque Tr* and the required power Pe* can be reduced by amounts larger than the difference ΔTrref and the difference ΔPeref by the transition to the CS mode at a time when the engine 22 is in the state where the engine 22 is likely to be started during the EV traveling in the CD mode. As a result, the start of the engine 22 can be suppressed.

Once the HVECU 70B determines in Step S210 that the transition to the CS mode has been requested, the traveling mode transition from the CD mode to the CS mode is made (Step S290), and then this routine is terminated. In this manner, the request for the transition from the CD mode to the CS mode can be responded to.

Once the HVECU 70B determines in Step S200 that the current traveling mode is the CS mode, it is determined whether or not a transition to the CD mode has been requested (Step S300). A time when the mode switch 89 has been operated is regarded as the time when the transition to the CD mode has been requested. Once it is determined that the transition to the CD mode has not been requested, the traveling mode is maintained in the CS mode (Step S370), and then this routine is terminated.

Once the HVECU 70B determines in Step S300 that the transition to the CD mode has been requested, it is determined whether the EV traveling is in progress or the HV traveling is in progress (Step S310). When it is determined that the HV traveling is in progress, the traveling mode transition is made from the CS mode to the CD mode (Step S380), and then this routine is terminated. In this manner, the request for the transition from the CS mode to the CD mode can be responded to.

Once the HVECU 70B determines in Step S310 that the EV traveling is in progress, the electric power storage ratio SOC of the battery 50 is compared to the threshold Sref (Step S320), the battery temperature Tb of the battery 50 is compared to the threshold Tbref (Step S330), the output limit Wout of the battery 50 is compared to the threshold Wref (Step S340), the temperature Tmg2 of the motor MG2 is compared to the threshold Tmg2ref (Step S350), and the positive-side torque limit Tm2lim of the motor MG2 is compared to the threshold Tm2limref (Step S360) as in the processing of Steps S230 to S270. The processing of Steps S320 to S360 is to predict (determine) whether or not the engine 22 is put into the state where the engine 22 is likely to be started in the CD mode in the event of a transition from a state of the EV traveling in the CS mode to a state of the EV traveling in the CD mode.

When the electric power storage ratio SOC of the battery 50 is equal to or higher than the threshold Sref, the battery temperature Tb of the battery 50 is equal to or higher than the threshold Tbref, the output limit Wout of the battery 50 is equal to or higher than the threshold Wref, the temperature Tmg2 of the motor MG2 is equal to or higher than the threshold Tmg2ref, and the torque limit Tm2lim of the motor MG2 is equal to or higher than the threshold Tm2limref in Steps S320 to S360, the HVECU 70B predicts (determines) that the engine 22 is not put into the state where the engine 22 is likely to be started in the CD mode despite the transition from the state of the EV traveling in the CS mode to the state of the EV traveling in the CD mode. Then, this routine is terminated after the traveling mode transition from the CS mode to the CD mode (Step S380). In this manner, the request for the transition from the CS mode to the CD mode can be responded to.

The HVECU 70B predicts (determines) that the engine 22 is put into the state where the engine 22 is likely to be started in the CD mode as a result of the transition from the state of the EV traveling in the CS mode to the state of the EV traveling in the CD mode when the electric power storage ratio SOC of the battery 50 falls short of the threshold Sref, when the battery temperature Tb of the battery 50 falls short of the threshold Tbref, when the output limit Wout of the battery 50 falls short of the threshold Wref, when the temperature Tmg2 of the motor MG2 is higher than the threshold Tmg2ref, and when the torque limit Tm2lim of the motor MG2 falls short of the threshold Tm2limref in Steps S320 to S360. Then, this routine is terminated after the traveling mode is maintained in the CS mode (Step S370). In the second example, the difference ΔTr between the required torque Tr* at the time of the CD mode and the required torque Tr* at the time of the CS mode exceeds the difference ΔTrref between the thresholds Trref and the difference ΔPe between the required power Pe* at the time of the CD mode and the required power Pe* at the time of the CS mode exceeds the difference ΔPeref between the thresholds Peref as described above. Accordingly, the increase in the required torque Tr* and the required power Pe* by the amounts larger than the difference ΔTrref and the difference ΔPeref can be avoided compared to the transition to the CD mode by the CS mode being maintained, that is, by no transition to the CD mode being made when it is predicted that the engine 22 is put into the state where the engine 22 is likely to be started in the CD mode as a result of the transition from the state of the EV traveling in the CS mode to the state of the EV traveling in the CD mode. As a result, the start of the engine 22 can be suppressed.

In the hybrid car 20B according to the second example described above, the HVECU 70B sets the required torque Tr* by using the map for the CS mode at a time of the CS mode and the HVECU 701B sets the required torque Tr* by using the map for the CD mode, in which the required torque Tr* is set to be higher than in the map for the CS mode, at a time of the CD mode. In addition, the difference ΔTr between the required torque Tr* at the time of the CD mode and the required torque Tr* at the time of the CS mode exceeds the difference ΔTrref between the thresholds Trref (=Trref2−Trref1) and the difference ΔPe between the required power Pe* at the time of the CD mode and the required power Pe* at the time of the CS mode exceeds the difference ΔPeref between the thresholds Peref (=Peref2−Peref1) in the entire range of the accelerator opening degree Acc (0% to 100%). During the EV traveling in the CD mode, the HVECU 70B determines that the engine 22 is in the state where the engine 22 is likely to be started and performs the transition from the CD mode to the CS mode when the electric power storage ratio SOC of the battery 50 falls short of the threshold Sref, when the battery temperature Tb of the battery 50 falls short of the threshold Tbref, when the output limit Wout of the battery 50 falls short of the threshold Wref, when the temperature Tmg2 of the motor MG2 is higher than the threshold Tmg2ref, and when the torque limit Tm2lim of the motor MG2 falls short of the threshold Tm2limref. In this manner, the required torque Tr* and the required power Pe* can be reduced by the amounts larger than the difference ΔTrref between the required torque Tr* at the time of the CD mode and the required torque Tr* at the time of the CS mode and the difference ΔPeref between the required power Pe* at the time of the CD mode and the required power Pe* at the time of the CS mode compared to the traveling mode being maintained in the CD mode, that is, the non-transition to the CS mode. As a result, the start of the engine 22 can be suppressed.

In addition, when the transition to the CD mode is requested during the EV traveling in the CS mode of the hybrid car 20B according to the example, the HVECU 70B predicts (determines) that the engine 22 is put into the state where the engine 22 is likely to be started in the CD mode as a result of the transition from the state of the EV traveling in the CS mode to the state of the EV traveling in the CD mode and maintains the CS mode when the electric power storage ratio SOC of the battery 50 falls short of the threshold Sref, when the battery temperature Tb of the battery 50 falls short of the threshold Tbref, when the output limit Wout of the battery 50 falls short of the threshold Wref, when the temperature Tmg2 of the motor MG2 is higher than the threshold Tmg2ref, and when the torque limit Tm2lim of the motor MG2 falls short of the threshold Tm2limref. In this manner, the increase in the required torque Tr* and the required power Pe* by the amounts larger than the difference ΔTrref between the required torque Tr* at the time of the CD mode and the required torque Tr* at the time of the CS mode and the difference ΔPeref between the required power Pe* at the time of the CD mode and the required power Pe* at the time of the CS mode can be avoided compared to the non-transition to the CD mode. As a result, the start of the engine 22 can be suppressed.

In the hybrid car 20B according to the second example, the HVECU 70B determines whether or not the engine 22 is in the state where the engine 22 is likely to be started by using the electric power storage ratio SOC, the battery temperature Tb, and the output limit Wout of the battery 50 and the torque limit Tm2lim of the motor MG2 at the time of the EV traveling in the CD mode. However, the HVECU 70B may also determine whether or not the engine 22 is in the state where the engine 22 is likely to be started by using some of these, for example, the output limit Wout and the torque limit Tm2lim.

When the transition to the CD mode is requested during the EV traveling in the CS mode of the hybrid car 20B according to the second example, the HVECU 70B predicts (determines), by using the electric power storage ratio SOC, the battery temperature Tb, and the output limit Wout of the battery 50 and the torque limit Tm2lim of the motor MG2, whether or not the engine 22 is put into the state where the engine 22 is likely to be started as a result of the transition to the CD mode. However, the HVECU 70B may predict (determine) whether or not the engine 22 is put into the state where the engine 22 is likely to be started as a result of the transition to the CD mode by using some of these, such as the output limit Wout and the torque limit Tm2lim, as well.

When the transition to the CD mode is requested during the EV traveling in the CS mode of the hybrid car 20B according to the second example, the HVECU 70B maintains the CS mode when the electric power storage ratio SOC of the battery 50 falls short of the threshold Sref, when the battery temperature Tb of the battery 50 falls short of the threshold Tbref, when the output limit Wout of the battery 50 falls short of the threshold Wref, when the temperature Tmg2 of the motor MG2 is higher than the threshold Tmg2ref, and when the torque limit Tm2lim of the motor MG2 falls short of the threshold Tm2limref. However, the traveling mode transition to the CD mode may be made as well.

In the hybrid car 20B according to the second example, the HVECU 70B allows the difference ΔTr between the required torque Tr* at the time of the CD mode and the required torque Tr* at the time of the CS mode to exceed the difference ΔTrref between the thresholds Trref (=Trref2−Trref1) and the difference ΔPe between the required power Pe* at the time of the CD mode and the required power Pe* at the time of the CS mode to exceed the difference ΔPeref between the thresholds Peref (=Peref2−Peref1) in the entire range of the accelerator opening degree Acc (0% to 100%). However, the difference ΔTr may exceed the difference ΔTrref and the difference ΔPe may exceed the difference ΔPeref in a part of the range of the accelerator opening degree Acc with the difference ΔTr being equal to or less than the difference ΔTrref or the difference ΔPe being equal to or less than the difference ΔPeref in the rest of the range of the accelerator opening degree Acc. When the engine 22 is in the state where the engine 22 is likely to be started during the EV traveling in the CD mode in this case, the HVECU 70B may perform the transition to the CS mode when the difference ΔTr exceeds the difference ΔTrref and the difference ΔPe exceeds the difference ΔPeref and may maintain the CD mode when the difference ΔTr is equal to or less than the difference ΔTrref or the difference ΔPe is equal to or less than the difference ΔPeref with respect to the accelerator opening degree Acc at that time. In addition, when the transition to the CD mode is requested during the EV traveling in the CS mode and the engine 22 is in the state where the engine 22 is likely to be started in this case, the HVECU 70B may maintain the CS mode when the difference ΔTr exceeds the difference ΔTrref and the difference ΔPe exceeds the difference ΔPeref and may perform the transition to the CD mode when the difference ΔTr is equal to or less than the difference ΔTrref or the difference ΔPe is equal to or less than the difference ΔPeref with respect to the accelerator opening degree Acc at that time.

Figure 5:
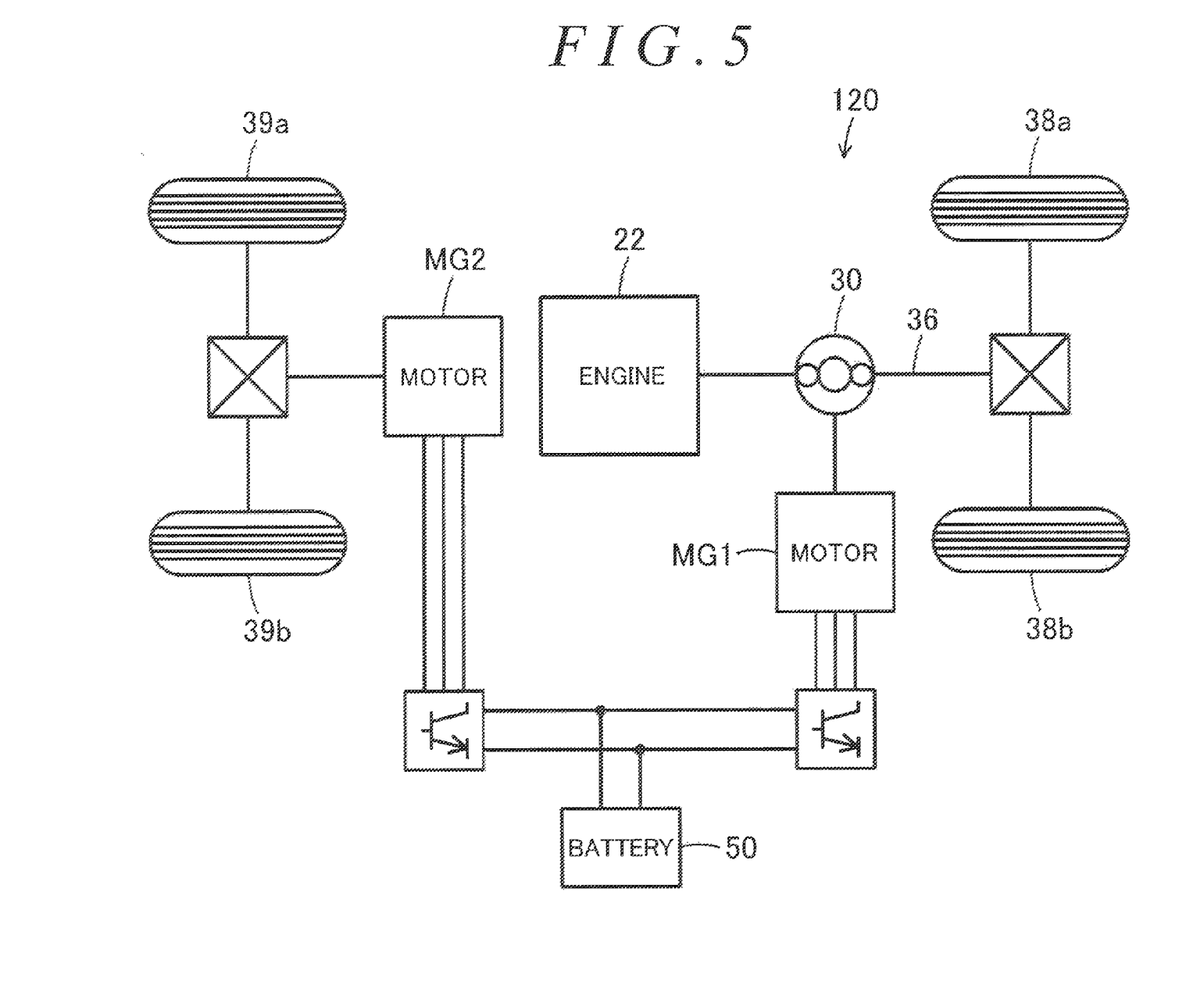
FIG. 5 is a configuration diagram schematically illustrating a configuration of a hybrid car 120 according to a modification example.

In the hybrid cars 20, 20B according to the first and second examples, the power from the motor MG2 is output to the drive shaft 36 connected to the drive wheels 38a, 38b. However, as shown in the form of a hybrid car 120 according to a modification example that is illustrated in FIG. 5, the power from the motor MG2 may also be output to an axle (axle connected to vehicle wheels 39a, 39b illustrated in FIG. 5) other than the axle to which the drive shaft 36 is connected (axle connected to the drive wheels 38a, 38b).

Figure 6:
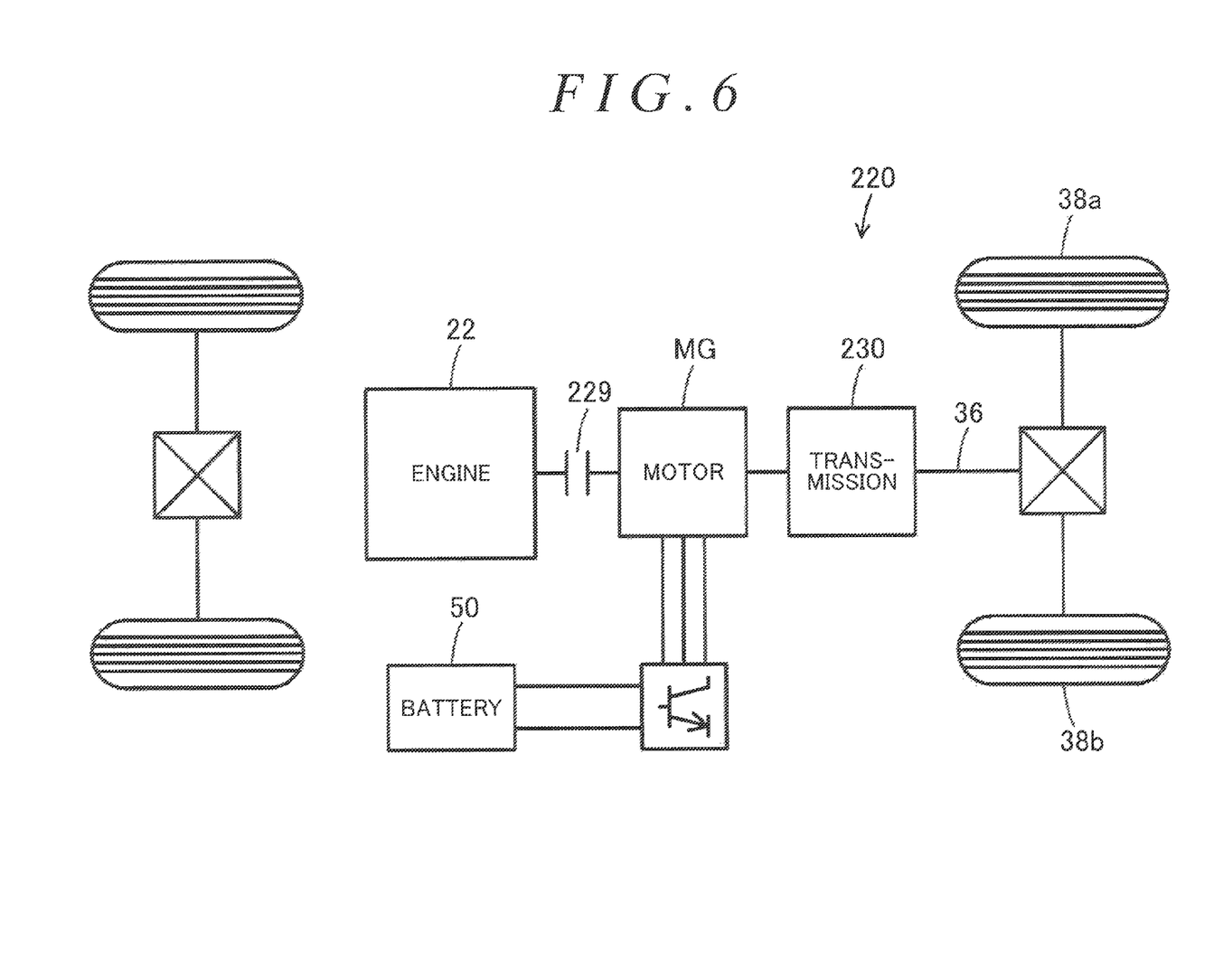
FIG. 6 is a configuration diagram schematically illustrating a configuration of a hybrid car 220 according to a modification example.

In the hybrid cars 20, 20B according to the first and second examples, the power from the engine 22 is output to the drive shaft 36 connected to the drive wheels 38a, 38b via the planetary gear 30 and the power from the motor MG2 is output to the drive shaft 36. However, as shown in the form of a hybrid car 220 according to a modification example that is illustrated in FIG. 6, the power from the engine 22 may be output to the drive shaft 36 via a rotary shaft of a motor MG and a transmission 230 and power from the motor MG may be output to the drive shaft via the transmission 230 in an alternative configuration in which the motor MG is connected via the transmission 230 to the drive shaft 36 connected to the drive wheels 38a, 38b and the engine 22 is connected to the rotary shaft of the motor MG via a clutch 229.

A correspondence relationship between main elements of the examples and main elements of the present disclosure described in Summary will be described. In the examples, the engine 22 corresponds to the "engine", the motor MG2 corresponds to the "motor", the battery 50 corresponds to the "battery", and the HVECU 70, 70B, the engine ECU 24, and the motor ECU 40 correspond to the "electronic control unit".

The correspondence relationship between the main elements of the examples and the main elements of the present disclosure described in Summary does not limit the elements of the present disclosure that are described in Summary because the examples are for exemplary purposes for a detailed description of the embodiment that is described in Summary. In other words, interpretation of the present disclosure described in Summary should be grounded on the description in that column, and it should be noted that the examples are merely specific examples of the present disclosure described in Summary.

The embodiment of the present disclosure has been described by the use of the examples. The invention, however, is not limited to these examples. It is a matter of course that the invention can be realized in various forms without departing from the scope of the present disclosure.

The present disclosure can be used in, for example, the hybrid car manufacturing industry.

What is claimed is:

1. A hybrid car comprising:
   an engine configured to output power for traveling;
   a motor configured to output power for traveling;
   a battery configured to exchange electric power with the motor, and
   an electronic control unit configured to
   i) control the engine and the motor for traveling in accordance with a required output for traveling with respect to an accelerator operation amount in one of a charge depleting mode and a charge sustaining mode,
   ii) start the engine and make a transition to hybrid traveling, which is traveling entailing an operation of the engine, when the required output becomes equal to or higher than a threshold during electric traveling as traveling not entailing the operation of the engine, and
   iii) set the required output such that the required output at a time when at least one of predetermined conditions is satisfied falls short of the required output at a time when the at least one of predetermined conditions is not satisfied with respect to the same accelerator operation amount during the electric traveling in the charge depleting mode,
   wherein the predetermined conditions include a condition that an electric power storage ratio of the battery falls short of a predetermined ratio, a condition that a temperature of the battery falls short of a first predetermined temperature, a condition that a maximum allowable output of the battery falls short of a first predetermined output, a condition that a temperature of the motor is higher than a second predetermined temperature, and a condition that a positive-side maximum allowable output of the motor (MG2) falls short of a second predetermined output.

2. The hybrid car according to claim 1, wherein the electronic control unit is configured to set the required output such that the required output at a time when the at least one of predetermined conditions is satisfied during the electric traveling in the charge depleting mode is equal to or higher than the required output during the electric traveling in the charge sustaining mode with respect to the same accelerator operation amount.

3. The hybrid car according to claim 2, wherein the electronic control unit is configured to set the required output such that the required output at the time when the at least one of predetermined conditions is satisfied during the electric traveling in the charge depleting mode is equal to the required output during the electric traveling in the charge sustaining mode with respect to the same accelerator operation amount.

4. The hybrid car according to claim 1, wherein the electronic control unit is configured to set the threshold at a time of the charge depleting mode to exceed the threshold at a time of the charge sustaining mode.

5. The hybrid car according to claim 1, wherein the electronic control unit is configured to
   i) start the engine and make the transition to the hybrid traveling, which is the traveling entailing the operation of the engine, when the required output becomes equal to or higher than a first threshold during the electric traveling, which is the traveling not entailing the operation of the engine, in the charge sustaining mode,
   ii) start the engine and make the transition to the hybrid traveling when the required output becomes equal to or higher than a second threshold, which is higher than the first threshold, during the electric traveling in the charge depleting mode,
   iii) set the required output such that the required output at a time of the charge depleting mode exceeds the required output at a time of the charge sustaining mode with respect to the same accelerator operation amount during the electric traveling, and
   iv) make a transition to the charge sustaining mode when at least one of the predetermined conditions is satisfied and a difference between the required output in the charge depleting mode and the required output in the charge sustaining mode with respect to the accelerator opening degree when at least one of the predetermined conditions is satisfied exceeds a difference between the second threshold and the first threshold during the electric traveling in the charge depleting mode.

6. The hybrid car according to claim 5, wherein the electronic control unit is configured to maintain the charge sustaining mode when the at least one of predetermined conditions is satisfied and the difference between the required output in the charge depleting mode and the required output in the charge sustaining mode with respect to the accelerator opening degree when at least one of the predetermined conditions is satisfied exceeds the difference between the second threshold and the first threshold while a request for a transition to the charge depleting mode is made during the electric traveling in the charge sustaining mode.

* * * * *